United States Patent
Karschti et al.

(10) Patent No.: US 6,770,375 B2
(45) Date of Patent: Aug. 3, 2004

(54) GLAZING, WHICH CAN BE SUBJECTED TO HIGH LEVELS OF THERMAL STRESS AND COMPRISING A GLASS BODY

(75) Inventors: Thomas Karschti, Budenheim (DE); Roland Leroux, Stadecken-Elsheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/240,950

(22) PCT Filed: Apr. 5, 2001

(86) PCT No.: PCT/EP01/03881

§ 371 (c)(1),
(2), (4) Date: Jan. 13, 2003

(87) PCT Pub. No.: WO01/77037

PCT Pub. Date: Oct. 18, 2001

(65) Prior Publication Data

US 2003/0162036 A1 Aug. 28, 2003

(30) Foreign Application Priority Data

Apr. 8, 2000 (DE) .......................................... 100 17 697

(51) Int. Cl.$^7$ ....................... B32B 17/06; B32B 17/00; B32B 33/00
(52) U.S. Cl. .................... 428/426; 428/410; 428/425.6; 428/451; 428/920
(58) Field of Search ............................. 428/426, 410, 428/421, 425.6, 442, 451, 920

(56) References Cited

U.S. PATENT DOCUMENTS

| | | | |
|---|---|---|---|
| 3,535,266 A | | 10/1970 | Lee |
| 3,615,320 A | | 10/1971 | Junge |
| 4,156,755 A | | 5/1979 | Rinehart |
| 4,198,466 A | | 4/1980 | Reade |
| 5,484,467 A | * | 1/1996 | Nass et al. .................... 65/33.4 |
| 5,624,761 A | * | 4/1997 | Sakamoto et al. .......... 428/426 |
| 6,479,155 B1 | * | 11/2002 | Gelderie et al. ............ 428/426 |

FOREIGN PATENT DOCUMENTS

| | | |
|---|---|---|
| DE | 38 17 240 A1 | 11/1989 |
| DE | 43 31 082 C | 4/1995 |
| DE | 43 31 082 C1 | 4/1995 |
| DE | 197 29 336 A | 1/1999 |
| EP | 0 524 418 A | 1/1993 |
| EP | 0 581 610 A1 | 2/1994 |
| FR | 2 097 400 A | 3/1972 |
| JP | 60 180936 A | 9/1985 |

* cited by examiner

Primary Examiner—Deborah Jones
Assistant Examiner—Jason L Savage
(74) Attorney, Agent, or Firm—Michael J. Striker

(57) ABSTRACT

The fire-resistant glazing includes one or more glass pane, at least one of which consists of glass containing nucleating agents so that the glass pane is at least partially ceramicized when subjected to high thermal stress sufficient to cause ceramicizing, for example during a fire. The glass may be tempered and contains, in percent by weight based on oxide content $SiO_2$, 55 to 69; $Al_2O_3$, 19 to 25 and $Li_2O$, 3.2 to 5.0. This glass pane combines the advantages of the strength of tempered glass at low temperature with the stability and long-term resistance to thermal stress of glass-ceramic material at high temperature. The fire-resistant glazing can also include at least one other glass pane made of a conventional glass and at least one plastic layer of PVB film.

10 Claims, No Drawings

GLAZING, WHICH CAN BE SUBJECTED TO HIGH LEVELS OF THERMAL STRESS AND COMPRISING A GLASS BODY

The invention concerns a glazing which can be subjected to high levels of thermal stress, in particular for fire-resistant glazing, and comprising a glass body.

In accordance with the fire resistance classes, fire-resistant glazings, including the framework and gripping mechanisms, must withstand thermal stress according to the standard fire curve (ISO fire curve) according to DIN 4102 (and/or ISO 834) for between 30 minutes and up to 180 minutes and prevent the passage of fire and smoke.

Moreover, additional requirements are often placed on building glazings. For example, glazings in doors must guarantee protection against fire as well as the safety of the users. To achieve this, the glazings must meet the requirements of applicable safety glass standards (e.g., single-pane safety glass DIN 1249, part 12).

These requirements are met in different fashions in the case of the known fire-resistant glazings, although all known systems have specific disadvantages.

For example, fire-resistant glazings are known (DE 38 17 240 A 1), in the case of which tempered glasses (lime/soda or borosilicate glasses) having appropriate thicknesses are used. They are, for example, lime/soda glasses having thicknesses of 6–15 mm for 30 or 60 minutes fire resistance, or borosilicate glasses having thicknesses of 5–8 mm for 30 to 120 minutes fire resistance. These tempered glasses have the disadvantage, however, that they exceed their softening temperature at a relatively early point in time (before the $60^{th}$ minute) during the thermal stress occurring when exposed to fire according to the ISO fire curve, and the previously solid, elastic glasses change to a low-viscosity, plastic state. It was made known in DE 43 31 082 C 1 to provide the lime/soda glass pane, before tempering, with a $TiO_2$ or $ZrO_3$ layer that is covered with an $SiO_2$ layer and that changes the physical properties of the glass and reinforces the pane in fire situations.

The softening of the glasses (softening temperature), however, is the main factor that determines whether or not long durations of fire resistance will be achieved. Further influential factors are the pane size, the pane thickness, and the width of the glass bite, as well as the holding force of the pane as well as the nature of the frame (material).

For example, the wider the glass bite of the pane is in the case of the aforementioned glasses, the longer the glasses are prevented from sliding out of the edge region if the glasses have reached their softening temperature while being exposed to fire.

At the same time, however, the width of the covered edge region is a very strong determining factor for the level of the thermal stresses occurring between the hot (exposed) center of the pane and the cold (covered) edge of the pane during exposure to fire.

If the thermally-induced tensions occurring during the warm-up phase—including the tensions resulting from other causes such as frame bending—exceed the strength of the glass, the glass pane invariably breaks and the protective effect of the fire-resistant glazing is therefore lost entirely. It is therefore not immediately possible to select any size of edge covering for the panes in order to achieve the longest duration of fire resistance possible. Other, supplementary measures can serve to achieve these higher fire resistance classes, e.g., reducing the size of the pane or, to a minimum extent, increasing the pane thickness or applying contact pressure to the pane in the edge region of the frame system using glass retaining strips under an appropriate preload, or by using an expanding sealing band.

Another type of fire-resistant glazing uses "multilayer laminated glass systems" to achieve long durations of fire resistance (>60 minutes) with lime/soda glasses. These systems are typically composed of a plurality of lime/soda glass panes (some of which are tempered) with heat-absorbing layers between them. These laminated glasses have the disadvantage, however, that they must have a very large number of glass layers and heat-absorbing layers in order to reach higher fire resistance classes. As a result, these laminated glasses are very costly to produce and are therefore expensive. Additionally, such glasses have a large thickness and, therefore, a very heavy weight and, associated therewith, costly frame systems. As a result, the frame constructions required to install such glasses becomes expensive as well.

The same applies for the laminated fire-resistant plate according to EP 0 524 418 B 1.

A further known fire-resistant glazing, e.g., a glazing according to "General Building Construction Certification Z-19.14-546" describes the use of panes made of glass ceramic.

Panes made of this material have the advantage that they do not soften unless exposed to much higher temperatures. In the case of exposure to fire according to the ISO fire curve, these temperatures are not reached until after a much longer time, so that the panes made of glass ceramic do not soften at all, or only slightly. As a result, these panes have a very low tendency to slide out of the frame system, and very long durations of fire resistance can therefore be achieved.

The disadvantage of these fire-resistant glazings made of glass ceramic lies in the fact that, compared to tempered panes, the corresponding panes made of glass ceramic have only minimal strength and therefore respond sensitively to the bending of the frame systems occurring during exposure to fire. Such panes can only be used in such frame systems in particular that have a very high stability and low bending in fire situations (e.g., special thick-walled or insulated steel or cement profile).

Moreover, such glass-ceramic panes (e.g., according to DIN EN 1748, part 2), due to their lack of tempering, cannot fulfill the requirements of single-pane safety glasses, for example according to DIN 1249, Part 12, without more. In order to fulfill the requirements placed on safety glasses with such panes made of glass ceramic, for example, a plurality of these non-tempered glass-ceramic panes must be combined with suitable Intermediate layers to form laminated safety glasses, as described in EP 0 581 620 A1, for example. These Intermediate layers are typically composed of very tough plastic materials, however, that can negatively influence the behavior of such laminated safety glasses in fire situations.

In addition to fire-resistant glazings, there are further fields of application that require a glass body which can be subjected to high levels of thermal stress. The same applies for these applications.

The invention is based on the object of creating a glazing which can be subjected to high levels of thermal stress, and comprising a glass body, that combines the advantages of glass ceramic to achieve long durations of resistance to stress with the advantages of tempered glasses to fulfill the safety glass requirements while preventing the disadvantages of these glasses from occurring.

This object is attained according to the invention by means of a glazing which can be subjected to high levels of thermal stress and comprising a glass body that contains the following main components in the composition (in percentage by weight, based on oxide)

| | |
|---|---|
| 55–69% | $SiO_2$ |
| 19–25% | $Al_2O_3$ |
| 3.2–5.0% | $Li_2O$ | as well as additions of nucleating agents commonly used in the ceramization of glass so that crystalline structures form in the glass body when the glazing is subjected to high levels of thermal stress.

The glazing, which can be subjected to high levels of thermal stress, and comprising a glass body designed according to the invention can be subjected to high levels of thermal stress without any additional mechanical measures. This ability to be subjected to high levels of thermal stress is based on the fact that the glass body forming the glazing, due to its composition, undergoes ceramization when exposed to thermal stress.

In addition to the components forming the glass, the required "nucleating agents" are already contained in this glass body forming the glazing. These nucleating agents allow the glass to change into a glass ceramic either entirely or partially when subjected to the appropriate temperature effect (e.g., when exposed to fire according to the ISO fire curve). This transformation of the glass into a fully or partially transparent glass ceramic—which progresses more intensively as the temperature increases—has the advantage that this glass ceramic, due to its very high softening temperature, does not tend to slide out of the frame prematurely.

This effect will be illustrated hereinbelow in comparison with a fire test according to DIN 4102 as an example, in which test the glass panes are subjected to specified temperature/time stressing, the "ISO fire curve" (the standard fire curve).

The temperatures in the furnace chamber reach the following values:

| | |
|---|---|
| approx. 841° C. | after 30 minutes |
| approx. 902° C. | after 45 minutes |
| approx. 945° C. | after 60 minutes |
| approx. 1005° C. | after 90 minutes |
| approx. 1049° C. | after 120 minutes |
| approx. 1109° C. | after 180 minutes. |

The temperatures of the glass panes subjected to such fire exposure are generally approximately 50–100 K lower on the side exposed to fire than the furnace chamber temperatures, and they are another approximately 50–100 K lower on the side not exposed to fire.

Due to these different temperatures, the softening point of the glasses used is not reached uniformly in the entire volume of the panes. Instead, the glass panes soften in layers in succession, starting on the side exposed to fire and moving toward the side not exposed to fire.

If the temperatures that are crucial for the softening of the glasses are reached throughout, the edges of conventional glass panes slowly begin to slide out of the frame. As the panes become increasingly hotter throughout, the softening intensifies and so does this slipping and sliding procedure, so that, after a certain amount of time, the panes and their edges slide completely out of the frame.

In contrast, in the case of the glass panes according to the invention, a partial ceramization of the glass panes begins on the side exposed to fire even before the softening of the glass has reached the side not exposed to fire. While a layer containing a high-quartz mixed crystal is already being formed on the side of the glass pane exposed to the fire, the side not exposed to fire remains largely vitreous initially, which allows the volume contraction associated with the partial crystallization to be thermally reduced. The entire pane is stabilized and strengthened as a result. Due to the fact that the ceramization of the pane increases further as the thermal stress increases, this stability is retained practically for the entire duration of the exposure to fire, so that very long durations of fire resistance (>120 minutes) can be achieved with such glass panes without having to increase the glass thickness of 5 mm, for example, or having to reduce the size of the glass, and without the need for special contact-pressure measures on the edge of the pane.

A fire-resistant glazing equipped with the glass panes according to the invention therefore fulfills the requirements—even with single glass panes—for fire resistance exceeding 120 minutes with small glass thicknesses of 5 mm, for example, as compared to a glass thickness of 8 mm, for example, when special borosilicate glass panes are used.

Fire resistance requirements exceeding 60 minutes with lime/soda glasses, on the other hand, cannot be achieved at all according to the related art with single glass panes, or they can only be achieved with very small panes, and not even those having a large thickness (e.g., 15 mm). It is therefore necessary to combine a plurality of such lime/soda glasses with heat-insulating intermediate layers.

Particular advantages with regard for thermal stressability and further properties of the glass body forming the glazing according to the invention are obtained when, according to an embodiment of the invention, the composition further contains at least one of the following main components (in percentage by weight, based on oxide):

each of the following, in a concentration up to the percentage indicated

| | |
|---|---|
| $Na_2O$ | 1.5% |
| $K_2O$ | 1.5% |
| MgO | 2.2% |
| $ZrO_2$ | 2.5% |
| CaO | 1.5% |
| SrO | 1.5% |
| BaO | 2.5% |
| ZnO | 1.5% |
| $P_2O_5$ | 3.0% |
| $TiO_2$ | 1.0–5.0% |
| $SnO_2$ | <1.0% |
| $\Sigma Na_2O + K_2O$ | up to 2.0% |
| and | |
| $\Sigma TiO_2 + ZrO_2 + SnO_2$ | 2.5–5.0% |
| and common refining agents, if necessary. | |

According to a further development of the invention, this glass body is tempered, preferably thermally, especially when it has the shape of a glass slab or glass pane. Because the chemical composition of the glass batch of the glass body is selected so that the glass produced after melting using the shaping methods common in the glass industry (e.g., drawing, founding, rolling, or floating) has the necessary physical properties to be tempered on conventional and/or modified air tempering apparatuses to form single-pane safety glass.

The glass panes of the glazing according to the invention therefore also fulfill all requirements placed on a "single-pane safety glass" for daily use, e.g., in doors.

According to a further embodiment of the invention, the fire resistance of the glass body can be increased by providing it with a metallic oxide coating.

The glass body is preferably provided with printing. As a result, architectonic and/or safety requirements (e.g., for improved recognition of the glass body in doors) can be fulfilled in the case of partial printing, and/or in the case of full-surface printing with suitable colors, the warming and, therefore, the ceramizing behavior of the glass body can be improved.

Even if the glass body of the glazing according to the invention already has significant fire resistance as a single-pane glass body, said fire resistance can be increased further according to a further embodiment of the invention when it is combined with one or more other glass bodies using one or more plastic layers to form a laminated glass.

The plastic layer can be formed, advantageously, by a commercially available PVB film.

All or some of the further glass bodies of the aforementioned laminated glass body can have a composition in accordance with the glass body according to the invention. All or some of them can also be composed of a glass material having another composition, however, such as tempered lime/soda glass or borosilicate glass or a glass ceramic. The soda glass according to DIN EN 572, the borosilicate glass according to DIN EN 1748-1 or the glass ceramic according to DIN EN 1748-2 are especially preferred.

The glass body of the glazing according to the invention can have different forms depending on the application. It typically has the form of a glass slab or a glass pane.

The invention will now be specified in greater detail with reference to two examples:

EXAMPLE 1

Four flat glass panes composed of the base glass for a commercially available glass ceramic having a thickness of 5 mm in the format 500 mm×500 mm were installed in steel frames having an edge margin of 15 mm and subjected to fire testing. The glass had the following main components (data presented in percentage by weight, based on oxide):

| | |
|---|---|
| 65% | $SiO_2$ |
| 22% | $Al_2O_3$ |
| 3.6% | $Li_2O$ |
| 2.3% | $TiO_2$ |
| 1.6% | $ZrO_2$. |

The panes were tempered in an air tempering apparatus at glass temperatures of approx. 810° C. until they completely fulfilled the safety glass requirements of DIN 1249, Part 12 with regard for tensile bending strength and fracture pattern.

The resistance time of these glazings in the fire test according to the ISO fire curve of DIN 4102, Part 13 was longer than 120 minutes.

EXAMPLE 2

Two flat glass panes composed of base glass according to Example 1 having a thickness of 5 mm in the format 1100 mm×2200 mm were installed in a steel frame having an edge margin of 15 mm and subjected to fire tests. The glass had the following main components (data presented in percentage by weight, based on oxide):

| | |
|---|---|
| 64.4% | $SiO_2$ |
| 22.0% | $Al_2O_3$ |
| 3.7% | $Li_2O$ |
| 2.4% | $TiO_2$ |
| 1.7% | $ZrO_2$. |

The panes were tempered in an air tempering apparatus at glass temperatures of approx. 800° C. until they completely fulfilled the safety glass requirements of DIN 1249, Part 12 with regard for tensile bending strength and fracture pattern.

The resistance time of these glazings in the fire test according to the ISO fire curve of DIN 4102, Part 13 was longer than 120 minutes.

What is claimed is:

1. A glazing comprising a glass body, wherein said glass body consists of glass and said glass contains nucleating agents for at least partially ceramicizing said glass so that a crystal phase forms in said glass body when said glass body is subjected to a thermal stress sufficiently high to cause said ceramicizing to occur;

wherein said glass has a composition comprising, in addition to said nucleating agents, in percent by weight based on oxide content:

| | |
|---|---|
| $SiO_2$ | 55 to 69 |
| $Al_2O_3$ | 19 to 25 |
| $Li_2O$ | 3.2 to 5.0. |

2. The glazing according to claim 1, wherein the composition of said glass further comprises at least one of the following ingredients, in percent by weight based on oxide content: $Na_2O$, up to 1.5; $K_2O$, up to 1.5: MgO, up to 2.2; $ZrO_2$, up to 2.5; CaO, up to 1.5; SrO, up to 1.5; BaO, up to 2.5; ZnO, up to 1.5; $P_2O_5$, up to 3.0; $TiO_2$, from 1.0 to 5.0; $SnO_2$, <1.0; and wherein a total amount of a sum of $Na_2O$ and $K_2O$ present is not greater than 2.0 percent by weight and a total amount of a sum of $TiO_2+ZrO_2+SnO_2$ is 2.5 to 5.0 percent by weight; as well as optionally at least one refining agent.

3. The glazing according to claim 1, wherein the glass is thermally tempered.

4. The glazing according to claim 1, wherein said glass body is provided with a metal oxide coating.

5. The glazing according to claim 1, wherein said glass body is a glass slab or glass pane and is provided with printing.

6. The glazing as defined in claim 1, wherein said glass body is combined with at least one other glass body and with at least one plastic layer to form a laminated glass article.

7. The glazing according to claim 6, wherein the at least one plastic layer is a PVB film.

8. The glazing according to claim 6, wherein said at least one other glass body consists of standard soda glass, standard borosilicate glass or standard glass-ceramic material.

9. The glazing according to claim 6, wherein said at least one other glass body consists of said glass containing said nucleating agents for at least partially ceramicizing said glass.

10. The glazing according to claim 6, wherein said glass body and said at least one other glass body are in the form of respective glass panes or glass slabs.

* * * * *